(12) United States Patent
Freyvogel

(10) Patent No.: US 7,632,175 B2
(45) Date of Patent: Dec. 15, 2009

(54) CUTTING BLADE HARD-FACING METHOD AND APPARATUS

(75) Inventor: Robert Freyvogel, Renfrew, PA (US)

(73) Assignee: Blount, Inc., Portland, OR (US)

( * ) Notice: Subject to any disclaimer, the term of this patent is extended or adjusted under 35 U.S.C. 154(b) by 0 days.

(21) Appl. No.: 10/839,773

(22) Filed: May 4, 2004

(65) Prior Publication Data

US 2005/0250427 A1    Nov. 10, 2005

(51) Int. Cl.
*B24B 41/047*    (2006.01)

(52) U.S. Cl. .................... 451/541; 451/544; 125/13.01; 76/31

(58) Field of Classification Search ............... 451/541, 451/544, 548; 15/13.01, 15, 18, 22; 76/31, 76/37, 48, 38; 125/13.01, 15, 18, 22
See application file for complete search history.

(56) References Cited

U.S. PATENT DOCUMENTS

| | | | | |
|---|---|---|---|---|
| 2,990,293 | A | * | 6/1961 | Toulmin, Jr. ................ 427/477 |
| 3,553,905 | A | * | 1/1971 | Lemelson .................... 451/541 |
| 3,563,286 | A | * | 2/1971 | Strobel et al. ................ 83/855 |
| 3,802,078 | A | * | 4/1974 | Denes ......................... 30/350 |
| 3,868,235 | A | * | 2/1975 | Held ........................... 51/309 |
| 3,889,741 | A | * | 6/1975 | Stier et al. ................... 164/332 |
| 3,956,858 | A | * | 5/1976 | Catlin et al. ................. 451/525 |
| 4,104,505 | A | * | 8/1978 | Rayment et al. .......... 219/76.16 |
| 4,116,375 | A | * | 9/1978 | Mozzhukhin et al. ......... 228/48 |
| 4,180,048 | A | * | 12/1979 | Regan ......................... 125/15 |
| 4,371,589 | A | * | 2/1983 | Warner et al. ............... 428/553 |
| 4,532,708 | A | | 8/1985 | Mensing |
| 4,571,184 | A | * | 2/1986 | Edwardson ................. 433/166 |
| 4,645,715 | A | * | 2/1987 | Ovshinsky et al. .......... 428/469 |
| 4,745,254 | A | * | 5/1988 | Funk ........................ 219/76.15 |
| 4,837,417 | A | * | 6/1989 | Funk ........................ 219/76.15 |
| 4,938,012 | A | | 7/1990 | Klima |

(Continued)

FOREIGN PATENT DOCUMENTS

FR    2811859 A1    1/2002

(Continued)

OTHER PUBLICATIONS

Nature of Therma Spray Coatings, www.gordonengland.co.uk/tsc.htm Feb. 21, 2001.*

*Primary Examiner*—Maurina Rachuba
(74) *Attorney, Agent, or Firm*—Schwabe Williamson & Wyatt

(57) ABSTRACT

A hard-faced cutting blade and hard-facing method is provided. A hard-facing material is applied to a cutting edge of a cutting blade such that a heat-affected transition zone may be created between the base metal and the hard-facing material. The heat-affected transition zone may create a sufficient bond to help resist delamination and flaking of the hard-facing material from the base metal.

16 Claims, 2 Drawing Sheets

U.S. PATENT DOCUMENTS

| | | | |
|---|---|---|---|
| 4,945,640 A | | 8/1990 | Garg et al. |
| 5,024,884 A | * | 6/1991 | Otfinoski .................... 428/328 |
| 5,299,892 A | * | 4/1994 | Pickert ........................ 407/32 |
| 5,448,035 A | * | 9/1995 | Thutt et al. .............. 219/76.13 |
| 5,752,307 A | * | 5/1998 | Hewitt ....................... 29/527.6 |
| 5,804,789 A | | 9/1998 | Saito |
| 5,812,926 A | * | 9/1998 | Wukusick et al. ........... 428/548 |
| 5,813,475 A | * | 9/1998 | Bergan et al. ............... 172/719 |
| 5,852,272 A | * | 12/1998 | Amano ................... 219/76.14 |
| 5,879,743 A | | 3/1999 | Revankar |
| 6,067,784 A | | 5/2000 | Jordan |
| 6,348,668 B1 | | 2/2002 | Moro et al. |
| 6,936,118 B2 | * | 8/2005 | Ando et al. ................. 148/522 |

FOREIGN PATENT DOCUMENTS

| | | |
|---|---|---|
| GB | 2176683 A | 1/1987 |
| WO | 00-08234 A1 | 2/2000 |

* cited by examiner

CUTTING BLADE HARD-FACING METHOD AND APPARATUS

FIELD OF THE INVENTION

Disclosed embodiments of the invention relate to the field of cutting blades, and more particularly, embodiments of the invention relate to a hard-faced cutting edge that may be used in environments such as lawn, garden, agricultural, and forestry applications.

BACKGROUND OF THE INVENTION

It is important for cutting blades, including but not limited to rotary cutting blades, to maintain a sharp and durable cutting edge throughout the life of the blade. One technique that has been used to increase the wear resistance of the cutting edge is to apply a layer of a harder material to the surface of the cutting blade that will resist wear. Often referred to as hard-facing, a number of different techniques exist for performing such an operation.

Some hard-facing methods involve mixing a powdered metal alloy with certain solvents to form a slurry, which is then applied to the metal surface of the cutting blade. The blade is then heated to cause the metal alloy to adhere to the metal of the cutting blade. Other hard-facing techniques include high velocity oxygen formation (HVOF). HVOF typically includes injecting the hard-facing metal alloy in powder or solid form into a high temperature high velocity flame. The flame accelerates the metal particles toward the metal blade and melts the hard-facing onto the surface of the base metal.

Though these hard-facing processes result in cutting blades having extended wear surfaces, they have several deficiencies, including, but not limited to, an unreliable bond created between the hard-facing material and the cutting blade base metal such that the hard-facing is prone to delaminating, chipping, or flaking during operation; the processes involved can impact the overall heat treatment of the cutting blade and therefore negatively impact the blade characteristics, such as making the blade more brittle and prone to cracking or shattering; and these processes are often expensive, laborious and can generate a substantial amount of waste material, which may be hazardous in nature.

BRIEF DESCRIPTION OF THE DRAWINGS

Embodiments in accordance with the present invention are illustrated by way of example and not by way of limitation in the figures of the accompanying drawings, in which the like references indicate similar elements and in which.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention, and embodiments in accordance therewith is defined by the appended claims and their equivalents.

Embodiments in accordance with the present invention provide a cutting blade, such as a rotary cutting blade, that has a hard-facing material applied to at least one surface of a cutting edge, wherein a heat-affected transition zone exists between the hard-facing material and the base metal of the cutting blade. The heat-affected transition zone may be an area where molecules of the hard-facing material may partially mix with the molecules of the base metal to provide an increased bond therebetween. Embodiments in accordance with the present invention may provide a hard-facing surface sufficiently bonded to the base metal of the cutting blade, such that chipping, delamination, and other negative effects encountered by current hard-facing blades are significantly reduced.

In one embodiment in accordance with the present invention, a rotary cutting blade includes a beveled cutting edge on opposite ends and opposite edges of the rotary cutting blade. A hard-facing material may be applied to the non-beveled edge portion in accordance with embodiments of the present invention. The beveled edge of the base metal may wear away at a faster rate than the edge having the hard-facing material applied thereto, which in turn may result in the cutting edge maintaining a sharp edge through a longer period of operational life. This not only may reduce the length of time between sharpening of the cutting edge, but also may increase the wear life of the rotary cutting blade.

Embodiments in accordance with the present invention include methods for applying a hard-facing material, such as tungsten carbide to cutting edge without dramatically affecting overall strength or toughness of the blade. One embodiment in accordance with the present invention, a rotary cutting blade having a hard-facing material applied to a cutting edge increases the wearability of the cutting blade, but does not cause the blade to become brittle such that it can fail standardized impact testing required for certain cutting blade applications.

Figure 1:
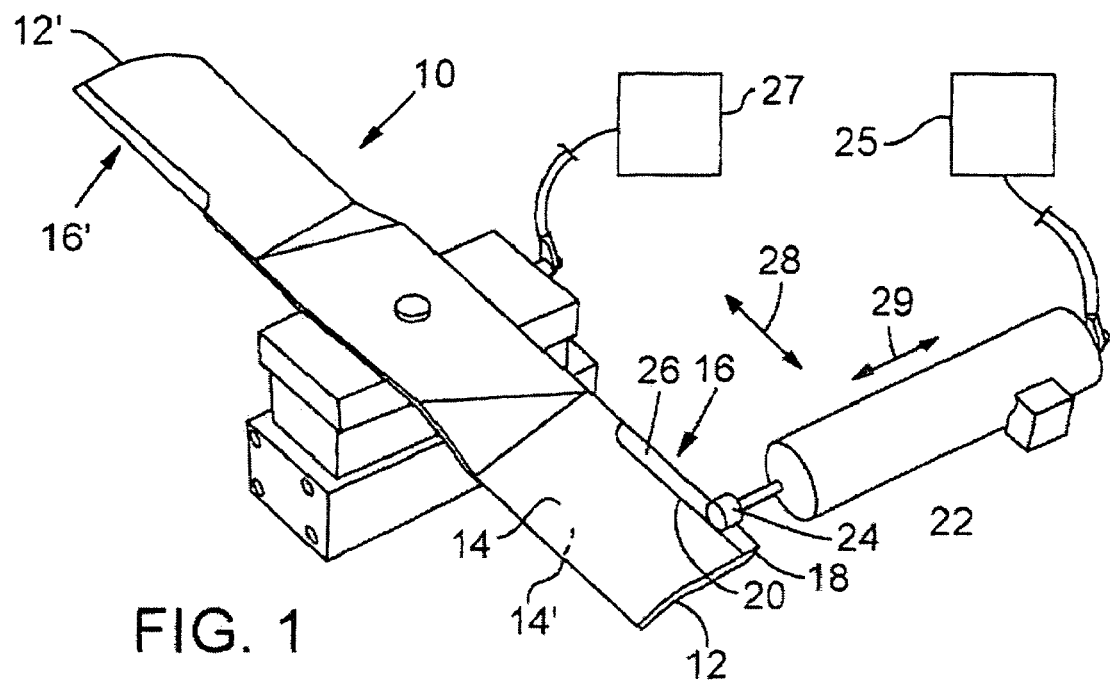
FIG. 1 illustrates a perspective view of a cutting blade in accordance with an embodiment of the present invention.

FIG. 1 illustrates a perspective view of a cutting blade in accordance with an embodiment of the present invention. Blade 10 may have a first end 12 and a second end 12', and a first side 14 and a second side 14'. Each end 12, 12' may have a cutting edge 16, 16'. Cutting edge 16 may consist of a second side beveled edge portion 18 and first side non-beveled edge portion 20. As the embodiment of the present invention illustrated in FIG. 1 uses a rotary cutting blade by way of illustration, it can be appreciated that the second end 12' of the cutting blade may have the same features and characteristics as that of the blade on the first end 12, but will not be expressly detailed herein.

A hard-facing applicator 22 may be used to apply a hard-facing material 26 to the non-beveled edge portion 20. Hard-facing applicator 22 may include a hard-facing material source 24, shown in the form of a consumable disk comprised of the hard-facing material 26. Hard-facing applicator 22 may be an electrically controlled device adapted to spin the disk in an annular fashion to prevent flat spots from being worn into the consumable disk 24. Hard-facing applicator 22 may also be adapted to move linearly in a substantially parallel direction with the non-beveled edge portion 18, as shown by movement arrows 28. Hard-facing applicator 22 may also be adapted to move perpendicularly to the non-beveled edge portion 18, as shown by directional arrows 29, to allow the consumable disk 24 to step to an untreated portion of the non-beveled edge. This can enable the user to achieve the desired width of hard-facing on the cutting blade, and/or may allow the applicator to apply more hard-facing material from consumable disk 24 in a particular area of non-beveled edge 20.

Hard-facing applicator 22 may be coupled to an electricity source 25, which may include any suitable voltage-generating device, and adapted to selectively and controllably supply voltage to disk 24. Cutting blade 10 may be electrically coupled to a ground or complementary voltage source 27, such as a negative voltage source. Cutting blade 10 then may act as an cathode and the consumable disk 24 may act as an anode (when coupled to electricity source 25), for example. In one embodiment, when a voltage is supplied to the disk 24, an arc may be generated between the disk 24 and the base metal of cutting blade 10 as current i flows from the anode to the cathode. This arcing action may cause the hard-facing material 26 to be deposited onto the non-beveled edge portion 20. The arcing action may also cause the hard-facing material of disk 24 to sufficiently bond with the base metal of cutting blade 10 through the creation of a heat-affected transition zone.

The hard-facing applicator 22 may be moved along the non-beveled edge portion 20 of the cutting edge 16 to deposit a layer of hard-facing material 26 along as much of the cutting edge 16 as is desired. Hard-facing applicator 22 may also move perpendicularly to step the disk 24 to a portion of the non-beveled edge portion 20 of the cutting edge 16 that has not had hard-facing material 26 yet applied. The hard-facing applicator may also be adapted to adjust the positioning of the consumable disk 24 with relation to the non-beveled edge portion 20 to allow the arcing action to occur, even as the disk is consumed. Rotation of the disk and linear movement 28 may prevent the consumable disk from staying in one position too long such that the consumable disk 24 welds to the non-beveled edge portion 20. This may also allow the consumable disk 24 to wear in a substantially uniform fashion.

It can be appreciated that the width and length of the hard-facing material 26 that is deposited may be controlled as desired depending on, for example, the blade size and configuration, or may be deposited depending on the portions of the blade that see the greatest amount of wear during operation, or based on other empirical factors. The depth of the hard-facing material 26 can vary. It has been found that depths ranging from 0.0004" to 0.005" in rotary cutting blade applications is sufficient to result in a heat-affected transition zone that may ensure a substantial bond between the hard-facing material and the base metal. It can be appreciated, however, that the overall depth of the hard-facing material may change depending on the application for the cutting blade.

In one embodiment in accordance with the present invention, it has been found that pulsing current i through the disk 24 at a rate in the range of 10 to 60 amps, may allow for a sufficient application of hard-facing material 26. Further, it has been found that cycling these pulses of current in a range of 50 to 400 Hertz may be sufficient to apply the hard-facing material 26 without overheating the blade, and/or causing certain blade characteristics, such as strength and toughness, to change and adversely impact the ability of the blade to meet certain impact standards.

In one embodiment in accordance with the present invention, the current i is not pulsed, but may be substantially maintained at a constant state. In such a case, the temperatures of the base metal may tend to rise higher and maintain elevated temperatures longer, which may, depending on the characteristics of the base metal, impact the strength and toughness of the blade.

Cutting blade 10 may include a base metal consisting of a carbon steel that may be typically used for cutting blade operations, with the carbon content and heat treatment modified such that the blade may achieve a desired hardness and toughness/strength suitable for the intended operation. Other carbon steel alloys may be used, including, but not limited to, boron steel and titanium steel. In many cutting blade applications, such as rotary cutting blades, hardness and toughness are two of the primary concerns. Hardness is typically used as a measure of the material's resistance to wear, where toughness or strength may be used as a measure of the blade's brittleness, e.g.; its ability to resist fracturing, cracking when an object is encountered.

Achieving a certain strength and toughness of the cutting blade is critical to the extent that certain regulatory bodies require the cutting blade strength to be such that impact of the cutting blade with a solid objects will not cause the cutting blade to break or fracture, such that people may be harmed by the fracturing pieces. For example, rotary cutting blades may be subject to many standards, such as the American National Standards Institute (ANSI) B 71.1 for walk behind mowers and ride-on machines with mowers, and the American Society of Agricultural Engineers (ASAE) S474, which governs agricultural rotary mower safety. These tests both involve inserting a steel stake into the rotating path of the rotary blade to evaluate what happens to the cutting edge of the blade when it impacts the metal stake. Both standards have requirements for scenarios that can cause the blade to fail the test, including but not limited to blade fracture, excessive chipping, and the like.

Hard-faced blades in accordance with embodiments of the present inventions may result in an increased hardness (i.e., wear resistant) blade that has a heat-treated strength such the toughness is not adversely altered by the hard-facing process such that it would render the blade unable to pass the tests set forth in the various standards.

Hard-facing material 26 may be any one of a variety of metal alloys that are known to have higher hardnesses, including but not limited to tungsten carbide, tungsten carbide having a cobalt content, boron carbide, nickel bonded carbide, stellite, and a variety of others metal alloys. In one embodiment in accordance with the present inventions, the hard-facing material 26 may be a tungsten carbide having a 6% cobalt content.

Figure 2:
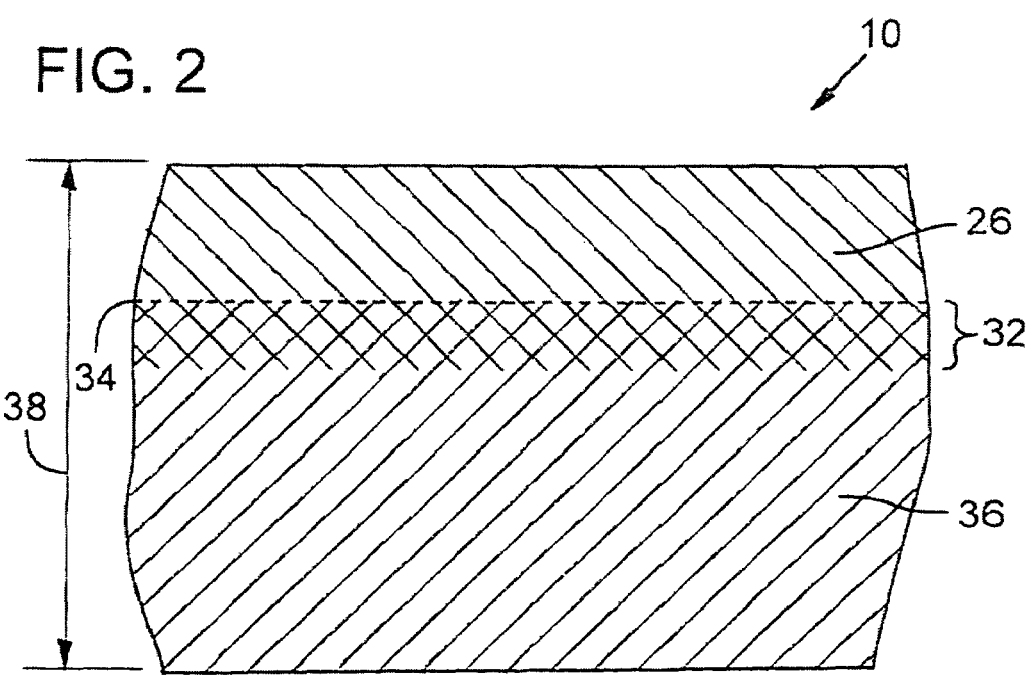
FIG. 2 illustrates an enlarged cross-sectional view of a cutting blade in accordance with an embodiment of the present invention.

FIG. 2 illustrates an enlarged cross-sectional view of a cutting blade in accordance with an embodiment of the present invention. Blade 10 has a hard-facing material 26 bonded to a first side 34 of the base metal 36 of cutting blade 10, and an overall thickness 38. As the hard-facing material 26 is deposited on the first side 34 of blade 10 in accordance with embodiments of the present invention, the arching action may cause a dramatic increase in the localized temperature at the first side 34 of base metal 36. The increased temperature may have several effects on the rotary cutting blade 10. One effect is that some of the molecules of the first surface 34 of base metal 36 may mix with the molecules of hard-facing material 26 thereby creating a heat-affected transition zone 32. Upon cooling, the heat-affected transition zone 32 may result in a sufficiently increased bond between hard-facing material 26 and the base metal of blade 10.

Another effect is that the metallurgical structure of the alloy may change such that the hardness and toughness of the blade may be altered. It has been found that the increase in heat results in the heat-affected transition zone has a hardness greater than that of the base metal but less than that of the hard-facing material. It has also been found that the heat-affected transition zone does not adversely impact the toughness of the blade such that it would fall below acceptable standards. The heat-affected transition zone and the bond associated therewith, may help the hard-facing material 26 resist flaking, chipping, or delaminating from the base metal of blade 10, both during normal operation as well as during abnormal incidents, such as the rigors imposed by various standardized testing requirements.

Heat-affected transition zone 32 may make up a relatively thin portion of the overall thickness 34 of the cutting blade 10 and may be controlled by the magnitude of current that is pulsed through the blade and the frequency of the pulses. It has been found that using too much current, or overextending the pulse duration may cause the heat-affected transition zone to increase in thickness and negatively impact the overall blade characteristics of the cutting blade 10, such as reducing strength and toughness. In one embodiment in accordance with the present invention, the thickness of the heat-affected transition zone may be less than 5% of the overall thickness 38 of the cutting blade 10. In another embodiment, the thickness of the heat-affected transition zone may be less than the thickness of the hard-facing material. It can be appreciated, however, that the thickness of the hard-facing material application can be adjusted to meet the needs of the operation in which the cutting blade is being used.

Figure 3A:
FIGS. 3A and 3B illustrate a 200× magnification of partial cross-sectional comparison views of a cutting blade having a hard-facing in accordance with the present invention and a cutting blade having a current hard-facing.
Figure 3B:
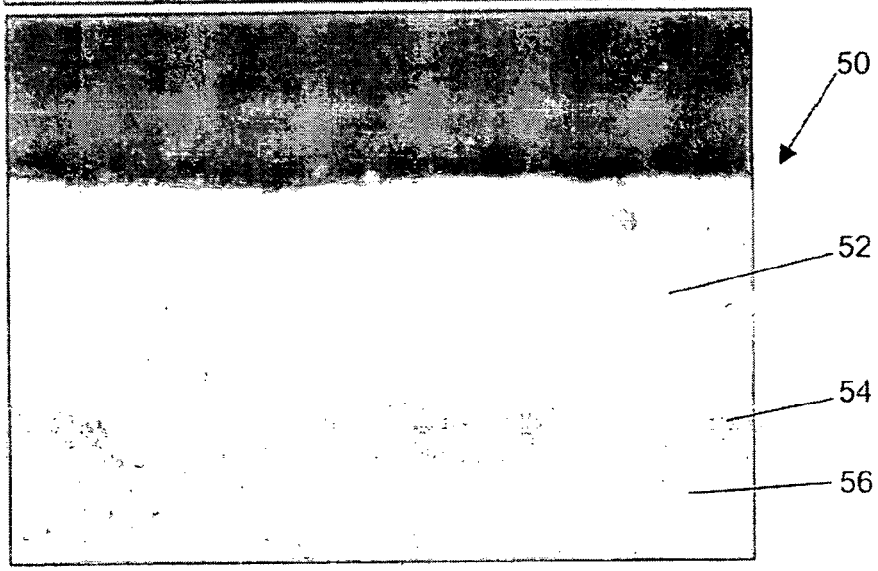

FIGS. 3A and 3B illustrate a 200× magnification of a partial cross-sectional comparison view of a cutting blade having a hard-facing in accordance with the present invention and a hard-facing known in the art, where the cross sectional blade pieces have been polished and subjected to a Nital etch. FIG. 3A is a photograph of a cross section of cutting blade in accordance with the present invention. Heat-affected transition zone 32 is disposed between hard-facing material 26 and base metal 36. FIG. 3B is a photograph of the cross section of a cutting blade 50 with a hard-facing material 52 as applied using a known method. No discernable heat-affected transition zone exists between the base metal 56 and the hard-facing material 52. Accordingly, the hard-facing 52 is prone to delaminate, chip, or separate at interface 54 during operation, and particularly where an object is encountered.

As illustrated in FIG. 3A, the hard-facing material 26 need not be evenly deposited across the surface of the cutting blade to be effective. Rather, it has been found that the obtaining a coverage of 50% or greater of hard-facing material along the length of the cutting edge may be sufficient to significantly increase the wear life of a cutting blade and result in an increased tendency for the cutting edge to remain sharp. It can be appreciated, however, that a less than 50% hard-facing material coverage may still achieve increased wear and result in the cutting edge maintaining a sharp edge longer than a cutting blade that does not have a hard-facing in accordance with the present invention.

As shown in FIG. 3B, the hard-facing surface 52 is relatively uniformly deposited across the cutting edge of the cutting blade. Achieving such uniformity is unnecessary with blades having the heat-affected transition zone. It can be appreciated, however, that the more consistent the coverage of the hard-facing material is across the cutting edge, the better the stay-sharp characteristics of the blade may be over the operational life of the blade.

In one embodiment in accordance with the present invention, the hard-facing material may be applied to the beveled edge portion of the cutting blade. In another embodiment in accordance with the present invention, hard-facing material may be applied to both the non-beveled edge portion and the beveled edge portion of the cutting edge. It can also be appreciated that though the cutting edge shown in the illustrated embodiments includes only one beveled edge to define the cutting edge, both edges may be beveled to define the cutting edge.

Embodiments in accordance with the present invention may be applied to a variety of cutting blade applications where it is important to maintain a certain strength and toughness, including, but not limited to, rotary cutting blades, such as lawnmower blades, reel-type mower blades, as well as teeth on a wood-cutting saw. Further, it can be appreciated that in accordance with embodiments of the present invention, the hard-facing material my be deposited using a hard-facing material source in forms other than disk form, such as a rod, billet, and the like.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A high speed cutting blade adapted for use in high impact cutting environments, comprising:
    a base metal having a cutting edge formed therein, the cutting edge adapted to cut organic material while traveling at a high rate of speed;
    a hard-facing material disposed on at least a portion of at least one side of the cutting edge, having an average thickness of greater than 0.01 inches; and
    a heat-affected transition zone between the at least one side of the cutting edge and the hard-facing material, the heat-affected transition zone having an average thickness of greater than or equal to about 5 micrometers such that the cutting blade resists delamination of the hard-facing material when the cutting edge impacts a hard material.

2. The cutting blade of claim 1, wherein the base metal has a first toughness and the hard-facing material has a second toughness that is greater than the first toughness, and the heat-affected transition zone having a third toughness that is between the first and second toughness.

3. The cutting blade of claim 1, wherein the heat-affected transition zone is caused by a mixing of molecules of the hard-facing material with molecules of the base metal.

4. The cutting blade of claim 1, wherein the cutting edge is defined by a beveled edge portion and a non-beveled edge portion, the hard-facing material being applied to the non-beveled edge portion.

5. The cutting blade of claim 4, wherein the cutting blade is a rotary cutting blade and the non-beveled edge portion is oriented facing a material being cut.

6. The cutting blade of claim 1, wherein the cutting blade has an overall thickness, and the heat-affected transition zone comprises less than 5% of the overall thickness.

7. The cutting blade of claim 1, wherein the hard-facing material is deposited such that it covers more than 50% of the surface of the cutting edge to which the heat-affected transition zone is applied.

8. The cutting blade of claim 1, wherein the cutting blade is a selected one a group consisting of a rotary cutting blade, reel-type mower blade, and a saw chain cutting tooth.

9. The cutting blade of claim 1, wherein the hard-facing material is a selected one a group consisting of a tungsten carbide, tungsten carbide with cobalt, boron carbide, nickel-bonded carbide, and stellite.

10. A high speed cutting blade adapted for use in high impact cutting environments, comprising:
   a base metal having a cutting edge formed therein and having a first toughness, the cutting edge adapted to cut organic material while traveling at a high rate of speed;
   a hard-facing material having an average thickness of greater than about 0.001" disposed on at least a portion of at least one side of the cutting edge, the hard facing material having a second toughness; and
   a heat-affected transition zone formed between the at least one side of the cutting edge and the hard-facing material by virtue of molecular mixing of the base metal and the hard facing material that results in a third toughness;
   wherein the third toughness is between the first and second toughness such that the cutting blade resists delamination of the hard-facing material when the cutting edge impacts a hard material.

11. The cutting blade of claim 10, wherein the heat-affected transition zone is created by localized energy pulses that cause the hard facing material to metallurgically bond with the base material.

12. A high speed cutting blade adapted for use in high impact cutting environments, comprising:
   a base metal having a cutting edge formed therein, the cutting edge adapted to cut organic material while traveling at a high rate of speed;
   a hard-facing material disposed on at least a portion of at least one side of the cutting edge formed by localized energy application of a current of 10 to 60 amps pulsed in a range of 50 to 400 Hertz directed to the hard facing material and/or the base metal; and
   a heat-affected transition zone of a sufficient thickness to resist delamination when impacting a hard material, and which is formed between the at least one side of the cutting edge and the hard-facing material by virtue of molecular mixing of the base metal and the hard facing caused by the localized energy.

13. A high speed cutting blade adapted for use in high impact cutting environments, comprising:
   a base metal having a cutting edge formed therein, the cutting edge adapted to cut organic material while traveling at a high rate of speed;
   a hard-facing material disposed on at least a portion of at least one side of the cutting edge having a first average thickness;
   a heat affected transition zone formed between the base metal and the hard facing material and having a second average thickness, wherein the second average thickness is greater than about half of the first average thickness.

14. The cutting blade of claim 13 wherein the average thickness of the heat-affected transition zone is greater than or equal to about 5 micrometers.

15. The cutting blade of claim 13 wherein the average thickness of the heat-affected transition zone is less than or equal to about 127 micrometers.

16. The cutting blade of claim 13 wherein the average thickness of the heat-affected transition zone is between about 5 and 127 micrometers.

* * * * *